(12) United States Patent
Alrajab

(10) Patent No.: US 9,912,934 B2
(45) Date of Patent: Mar. 6, 2018

(54) DETERMINING THREE DIMENSIONAL INFORMATION USING A SINGLE CAMERA

(71) Applicant: Moaath Alrajab, New York, NY (US)

(72) Inventor: Moaath Alrajab, New York, NY (US)

(*) Notice: Subject to any disclaimer, the term of this patent is extended or adjusted under 35 U.S.C. 154(b) by 321 days.

(21) Appl. No.: 14/726,169

(22) Filed: May 29, 2015

(65) Prior Publication Data

US 2016/0021357 A1    Jan. 21, 2016

Related U.S. Application Data

(60) Provisional application No. 62/027,228, filed on Jul. 21, 2014.

(51) Int. Cl.
*H04N 13/02*    (2006.01)

(52) U.S. Cl.
CPC ..... *H04N 13/0207* (2013.01); *H04N 13/0271* (2013.01)

(58) Field of Classification Search
None
See application file for complete search history.

(56) References Cited

U.S. PATENT DOCUMENTS

| | | | |
|---|---|---|---|
| 6,711,293 B1 | 3/2004 | Lowe | |
| 7,027,659 B1* | 4/2006 | Thomas | H04N 13/0003 348/E13.008 |
| 9,223,404 B1* | 12/2015 | Ivanchenko | G06T 7/11 |
| 2011/0025829 A1* | 2/2011 | McNamer | H04N 13/021 348/50 |

OTHER PUBLICATIONS

D. Marr and T. Poggio, "A Computational Theory of Human Stereo Vision", Proc. Royal Society of London, vol. 204 of B, pp. 301-328, 1979.
S. Pollard, J. Mayhew and J. Frisby, "PMF: A Stereo Correspondence Algorithm Using a Disparity Gradient Limit", Perception 14(4), 449-470, 1985.
W. E. L. Grimson, "A Computer Implementation of a Theory of Human Stereo Vision", Philosophical Transactions of the Royal Society of London, Series B, 292, 1981.

* cited by examiner

*Primary Examiner* — Andy Rao
*Assistant Examiner* — Samuel D Fereja
(74) *Attorney, Agent, or Firm* — Davis Wright Tremaine LLP

(57) ABSTRACT

Two dimensional images captured by a camera or other device may be used to generate three dimensional information for target objects included in the two dimensional images. Sensor information and other information associated with the device capturing the two dimensional images may be obtained and used to determine a displacement or movement of the camera during capture of the two dimensional images. The displacement or movement may be used to calculate a distance of the target object in the two dimensional images. The distance information may be used to generate virtual planes corresponding to the target objects.

20 Claims, 6 Drawing Sheets

DETERMINING THREE DIMENSIONAL INFORMATION USING A SINGLE CAMERA

BACKGROUND

The present disclosure relates to the use of image sensors to simulate human binocular vision and therefore capture three-dimensional images. The process, known as stereo photography, utilizes two or more separate image sensors to capture three-dimensional images. The distance between the image sensors, referred to as the intra-axial distance, is fixed in most stereo camera systems. Furthermore, stereo camera systems may be used for determining the depth to points in the scene, for example, from the center point of the line between their focal points. In order to solve the depth measurement problem using a stereo camera system, it is necessary to first find corresponding points in the different images. Solving the correspondence problem is one of the main problems when using this type of technique. For instance, it is difficult to solve the correspondence problem for image points that lie inside regions of homogeneous intensity or color. As a consequence, range imaging based on stereo triangulation can usually produce reliable depth estimates only for a subset of all points visible in the multiple cameras. Additionally, these techniques require multiple cameras to generate a single three-dimensional image.

BRIEF SUMMARY

Embodiments of the present invention provide a method of determining one or more discrete layers of a scene or image based at least in part on a continuous disparity mapping of the scene or image. The one or more discrete layers correspond to the approximate distance of a target object in the scene or image. Two dimensional information of the target object may be obtained from the scene or image and used to place the target object onto a virtual layer at the approximate distance of the corresponding discrete layer determined based at least in part on the continuous disparity mapping described above.

The following detailed description together with the accompanying drawings will provide a better understanding of the nature and advantages of the present invention.

BRIEF DESCRIPTION OF THE FIGURES

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems, and processes to detect a target object in a two dimensional image and generate three dimensional information corresponding to the detected target object. The generated three dimensional information may be used to generate a three dimensional image or plane of the target object. Additionally, the three dimensional information may be used to generate a multi-layer format such as Photoshop file format (PSD), large document format (PSB), drawing format (DWG), or any other file format suitable for storing pixel information in any dimension. Two or more images captured using a camera may be used to generate a continuous disparity mapping of the scene included in the images. The continuous disparity mapping may be used to split the scene into discrete layers and the discrete layers may correspond to an approximate distance of one or more target objects included in the images.

The images may be captures using one or more imaging sensors. For example, a mobile device may capture the images using a camera or similar sensor connected to the mobile device. The mobile device may include various other sensors as well as including a gyroscope, accelerometer, a proximity sensor, a magnetometer, a tracking sensor (e.g., M7 Chip), or global position system sensor. Information collected from these sensors may be used to determine an estimated distance of one or more target objects included in the images. Determining the distance of a target object in an image or scene may be part of auto-focus operations performed by the camera capturing the picture. When a user of the mobile device takes a picture of a target object or scene, it is unlikely that the user will be able to hold the mobile device in the same location from the start to the end of the process.

Therefore, the mobile device, in an embodiment, is configured to obtain information from the sensors of the mobile device at two or more intervals of time during the process of capturing the scene by the user. The information obtained from the sensors of the mobile device provides information corresponding to the movement of the mobile device and camera included in the mobile device. This movement information may be used to determine an approximate distance of a target object included in the scene. The determined approximate distance of the target object may then be used to project a set of pixels corresponding to the target object onto a virtual plane.

Figure 1:
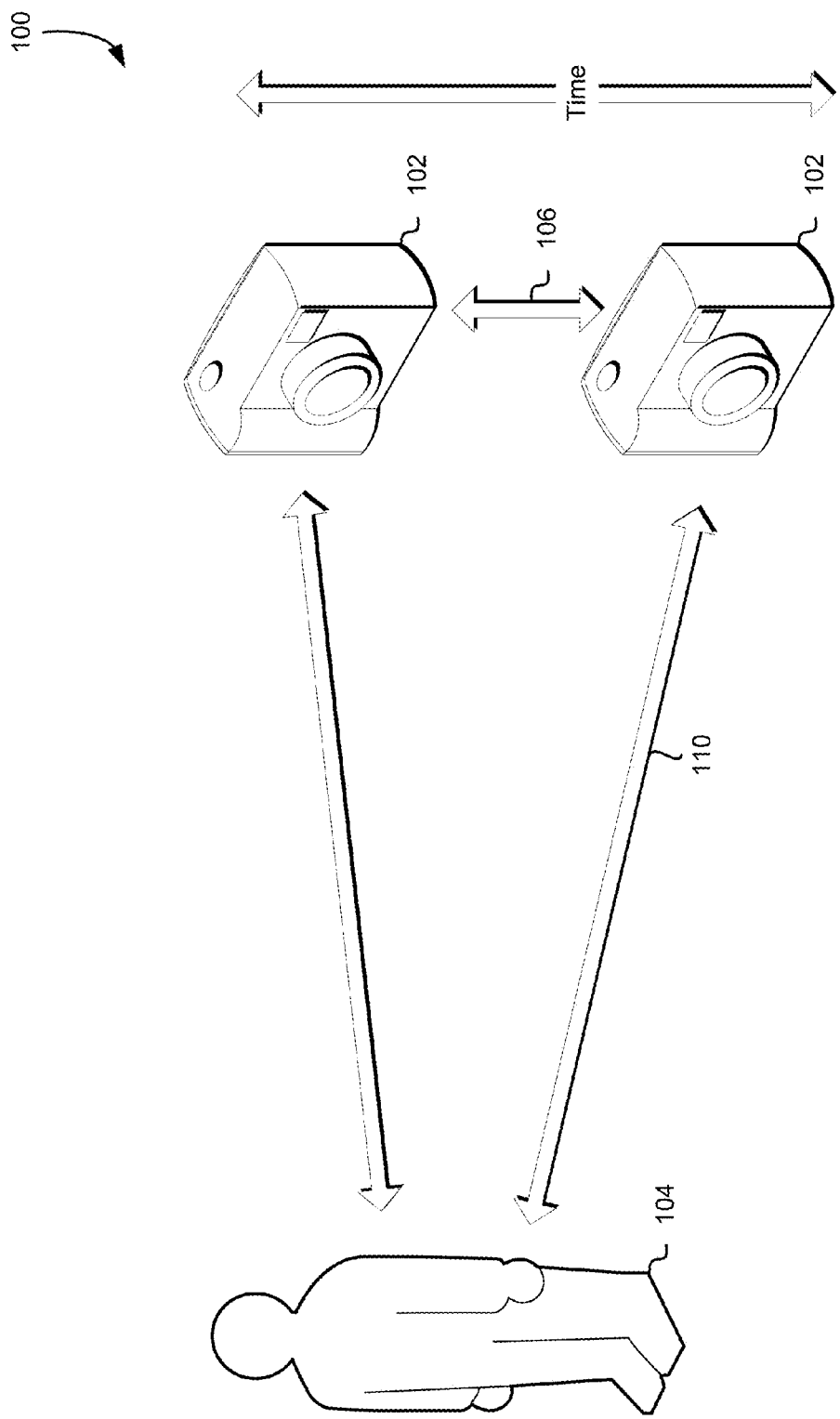
FIG. 1 illustrates a three dimensional camera system in which an object's approximate distance may be determined in accordance with an embodiment.

FIG. 1 illustrates an environment 100 in which stereo information for a target object 104 included in a scene may be determined in accordance with an embodiment. The scene may be captured using a camera 102. In various embodiments, the camera 102 is integrated into another device such as a mobile phone, tablet, or other mobile device. Additionally, the camera 102 may include or have access to various sensors. The various sensors may provide information suitable for determining movement 106 of the camera 102 and distance 110 of the target object 104 from the camera 102.

For example, the movement 106 of a mobile device including the camera 102 may be calculated using a gyroscope, compass, and Global Positioning System (GPS) sensor included in the mobile device. The calculated movement 106 of the camera 102 may be suitable for determining a required displacement which may be used in calculating the distance of the target object 104. In various embodiments, if a level of calibration and/or precision between the images captured by the camera 102 and the movement 106 of the camera 102 is low, the camera 102 or other system calculating the disparity mapping and/or three dimensional information will calculate only an approximation of the plane of the target object 104. For example, an absolute value of the movement 106 may be less than an inch and the placement of the camera 102 for the second or subsequent images may not be predetermined; however, the camera 102 or system calculating the disparity mapping and/or three dimensional information may calculate an approximate virtual plane corresponding to the target object 104. The disparity map may include information corresponding to a calculated (or apparent if observed by a user of the mobile device) difference or movement between pixels in two or more images of a stereo image (e.g., the two or more images captured by camera 102).

However, in yet other embodiments, if the camera 102 or system calculating the disparity mapping and/or other three dimensional information has sufficient processing power, a finer output of the virtual plane may be calculated. As illustrated in FIG. 1, the movement 106 or displacement of the camera 102 may be used to determine the distance 110 of the target object 104 using various stereo vision techniques. Furthermore, the software included in the camera 102 may be configured to calibrate the various stereo vision techniques in order to determine the distance 110 of the target object 104.

Figure 2:
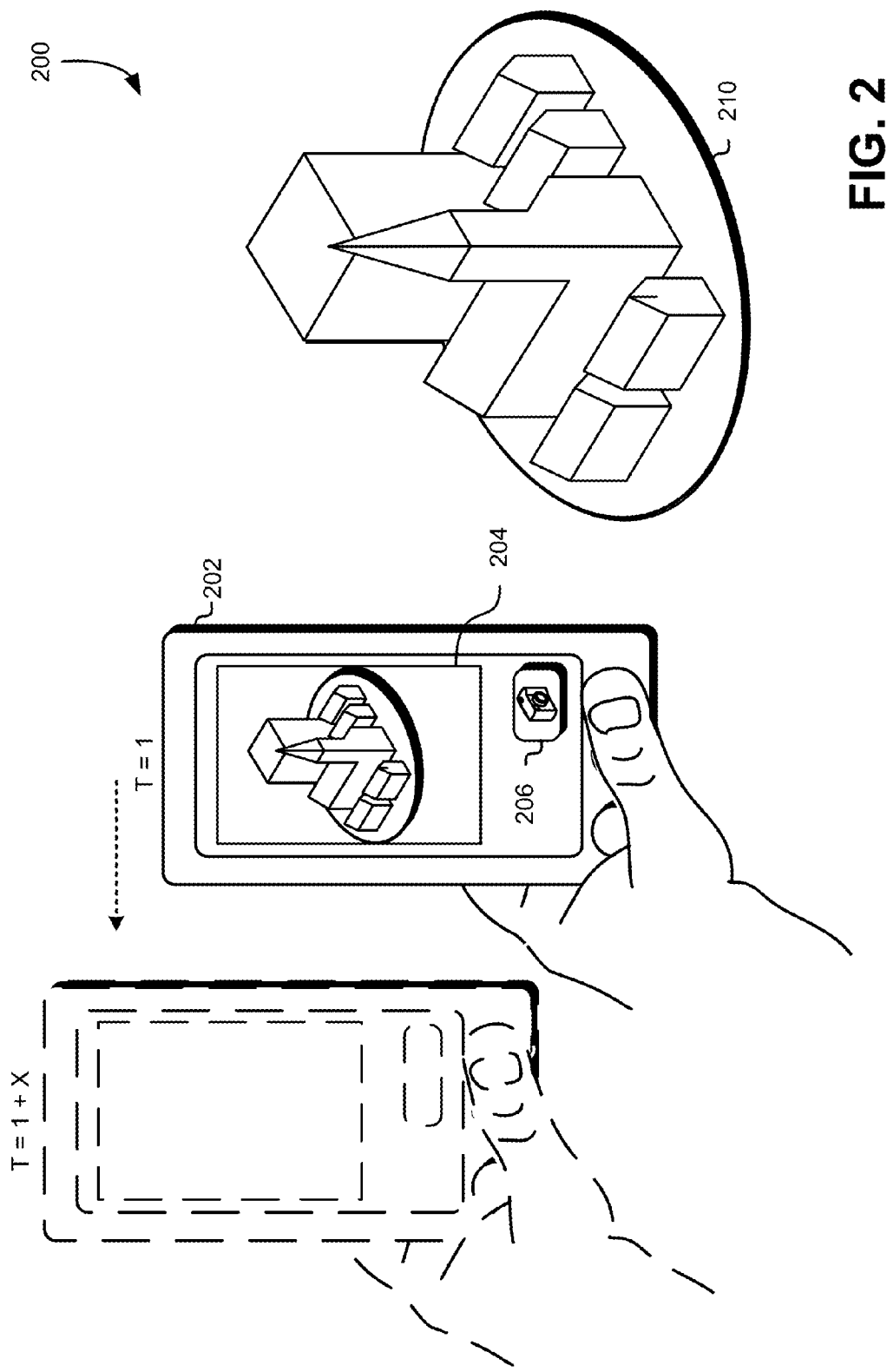
FIG. 2 illustrates an environment where three dimensional information may be captured in accordance with an embodiment.

FIG. 2 illustrates an environment 200 in which camera sensors included in a mobile device 202 may capture images of a scene 210 over an interval of time usable for generating three dimensional information for various target objects in the scene as described herein in connection with FIG. 2 and in accordance with an embodiment. The mobile device 202 may include a variety of different devices such as smart phones, tablets, mobile phones, or other computer system described in greater detail below in connection with FIG. 6. The mobile device 202 may include a camera application or other executable code stored in memory of the mobile device 202 that may cause the mobile device to execute the various operations described in the present disclosure.

As illustrated in FIG. 2, the mobile device 202 may include a display 204, such as a touch-screen or liquid-crystal display (LCD). The display 204 may output information to a user of the mobile device 202. For example, the display may output instructions to the user such as how to capture an image or instructions on how to move the mobile device 202 while capturing the image to enable the mobile device 202 to obtain information suitable for generating disparity mapping, virtual plane, and other three dimensional information. The display 204 may also output to the user an image of the scene 210 to be captured as illustrated in FIG. 2. Furthermore, the display 204 may also display a target object from the scene 210 on a virtual plane described in greater detail below. Furthermore, the mobile device 202 may include a "capture" button 206. The capture button 206 may be a physical button integrated into the mobile device 202 or may be an image displayed on a touch-screen of the mobile device 202. The capture button 206 may be configured such that once the button is pressed by the user the mobile device 202 captures a plurality of images of the scene 210 in order to generate a virtual plane corresponding to a target object in the scene 210.

In various embodiments, the user of the mobile device 202 moves the mobile device 202 while attempting to capture the scene 210. For example, it may be difficult for the user to maintain the mobile device 202 completely still for an interval of time, such as a few seconds. During this time, the mobile device 202 may be configured to capture two or more images for use in calculating the virtual plane of a target object. As illustrated in FIG. 2, the user may press the capture button 206 at a first time (labeled T=1 in FIG. 2). This may cause the mobile device to capture an image of the scene 210. The image may be capture contemporaneously or near contemporaneously with the user pressing the capture button 206. Furthermore, the mobile device 202 may be configured to capture a second image at a second time after the first time (labeled as T=1+X in FIG. 2). The second time may be predetermined or may be calculated based on one or more attributes of the mobile device 202. For example, the second time may be determined based on detecting movement of the mobile device by one or more sensors of the mobile device, such as an accelerometer or GPS sensor. In various embodiments, the mobile device 202 is configured to capture more than two images of the scene 210. Furthermore, the mobile device 202 may the determine two images of the images captured by the mobile device 202 to use for calculating the virtual plane for a particular target object included in the scene 210.

Constructing the three dimensional information (or even approximating the 3D distance) may require image matching. At least two images should be matched after a given displacement between the point at which the images where captured. There are many matching techniques that may be used in accordance with the present disclosure, such as scale-invariant feature transform (SIFT). For any object in an image, interesting points on the object can be extracted to provide a "feature description" of the object. This description, extracted from a training image, can then be used to identify the object when attempting to locate the object in a test image containing many other objects. To perform reliable recognition, it is important that the features extracted from the training image be detectable even under changes in image scale, noise and illumination. Such points usually lie on high-contrast regions of the image, such as object edges. The virtual planes may be calculated by determining a point of interest P before the displacement at a reference location and at a second location (or transformed location) after the displacement. The depth of the virtual plane (e.g., the three dimensional information) may be calculated using the following formula:

$$Z = \frac{B \cdot f}{x_R - x_T}$$

Where Z equals the depth of the virtual plane, B is the displacement of the camera which may be determined based on sensor information. Furthermore, $x_R - x_T$ may be the disparity from point P of the reference location and the transformed location.

Figure 3:
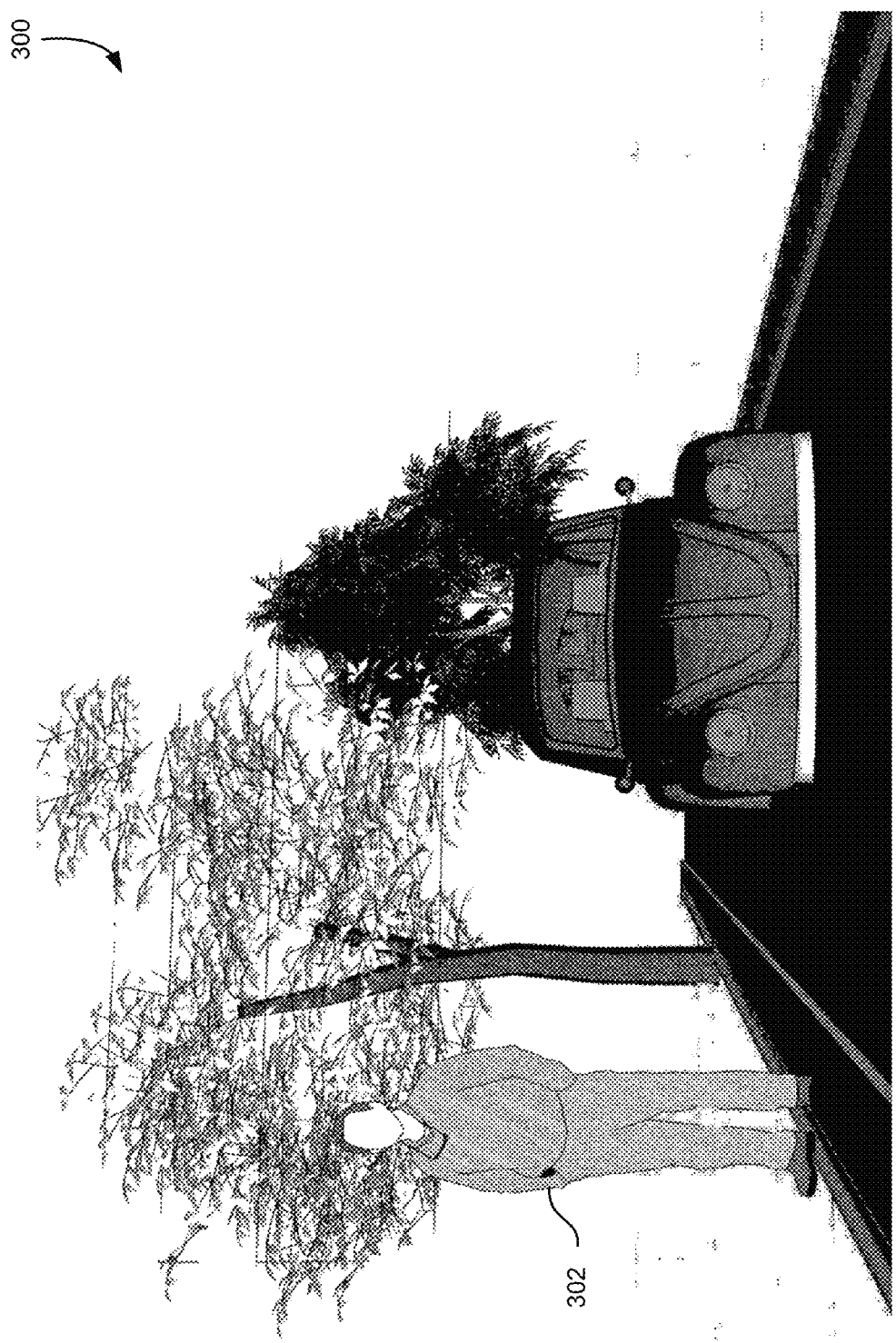
FIG. 3 illustrates an image from which three dimensional information may be obtained in accordance with an embodiment.

FIG. 3 illustrates a single layer of an image 300 captured by a camera or other sensor in accordance with an embodiment. The image may include various objects, such as the car, person, and two trees displayed in FIG. 3. A virtual plane may be calculated for each object included in the image. The virtual plane may enable display of the target object on the virtual plane without any of the other objects included in the image 300. Furthermore, the object may be displayed on the virtual plane without any noise, e.g., pixels corresponding to another object included in the image 300. As illustrated in FIG. 3, the image 300 may be a two dimensional image and therefore the pixels of image 300 may only contain information in two dimensions.

As described above in connection with FIG. 2, the mobile device or other computer system capturing the image may be configured to capture multiple images in a defined manner in response to a command from a user. Once multiple images are captured, a virtual place for a target object, such as the person 302 in image 300, may be calculated based at least in part on the multiple images and a displacement or distance between the locations of the device capturing the multiple images during the defined manner in which the images where captured. Specifically, the device may be configured to capture image 300 at a first time and a second image at a second time. The device may then calculate a virtual plane corresponding to the person 302 using the two images and a displacement of the device between the first time and the second time. Virtual planes are described in greater detail below in connection with FIG. 4.

Figure 4:
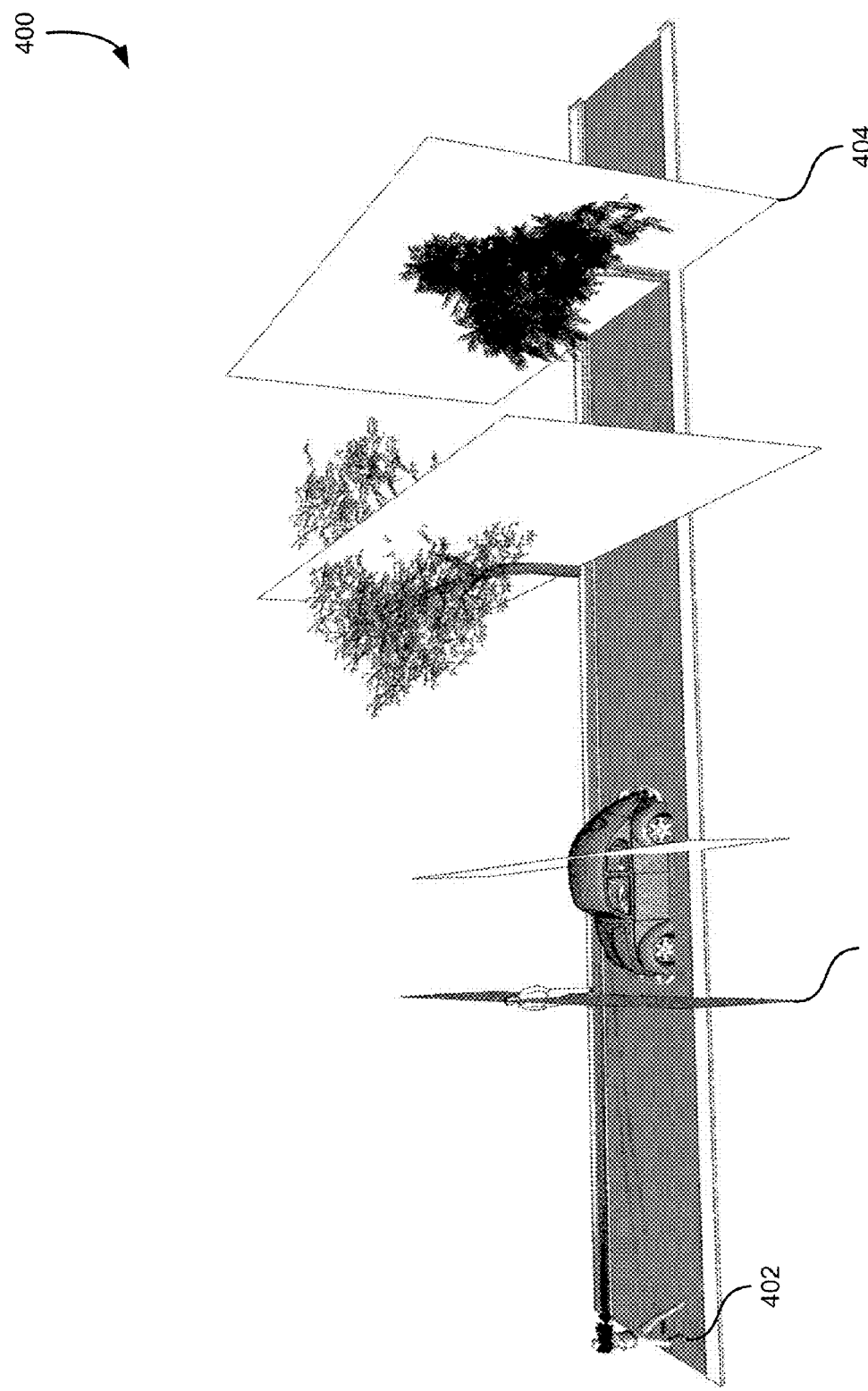
FIG. 4 illustrates an image including various discrete layers containing three dimensional information in accordance with an embodiment.

FIG. 4 illustrates a scene 400 including multiple layers or virtual planes of an image, such as the image 300 described above in connection with FIG. 3, captured by a camera 402 or other sensor in accordance with an embodiment. The camera 402 may capture multiple images of the scene 400 at various different positions as described above. In various embodiments, the distance between the various different positions may be greater for capturing information corresponding to a virtual plane further from the camera 402, such as the virtual plane corresponding to the tree 404 as shown in FIG. 4. Alternatively, the distance required between the various positions of the camera 402 for a target object and virtual plane closer to the camera 402, such as virtual plane corresponding to the person 406, may be smaller.

The virtual planes depicted in FIG. 4, may contain two-dimensional pixels or pixel information from an image as well as distance information corresponding to the pixel, e.g., a distance between a target object associated with the pixel and the camera 402. A separate image may be generated for each virtual plane. The virtual plane may contain only the pixels associated with the target object and no noise or other back ground pixels. Furthermore, the virtual planes and separate images for each virtual plane may be generated by the device capturing the images used to generate the virtual plane. For example, a user of a mobile device may set various settings of a camera application of the mobile device. The settings may cause the camera to capture multiple images of the same scene as described above. The user may then select a target object from the scene and a virtual plane for the target object may be calculated.

Figure 5:
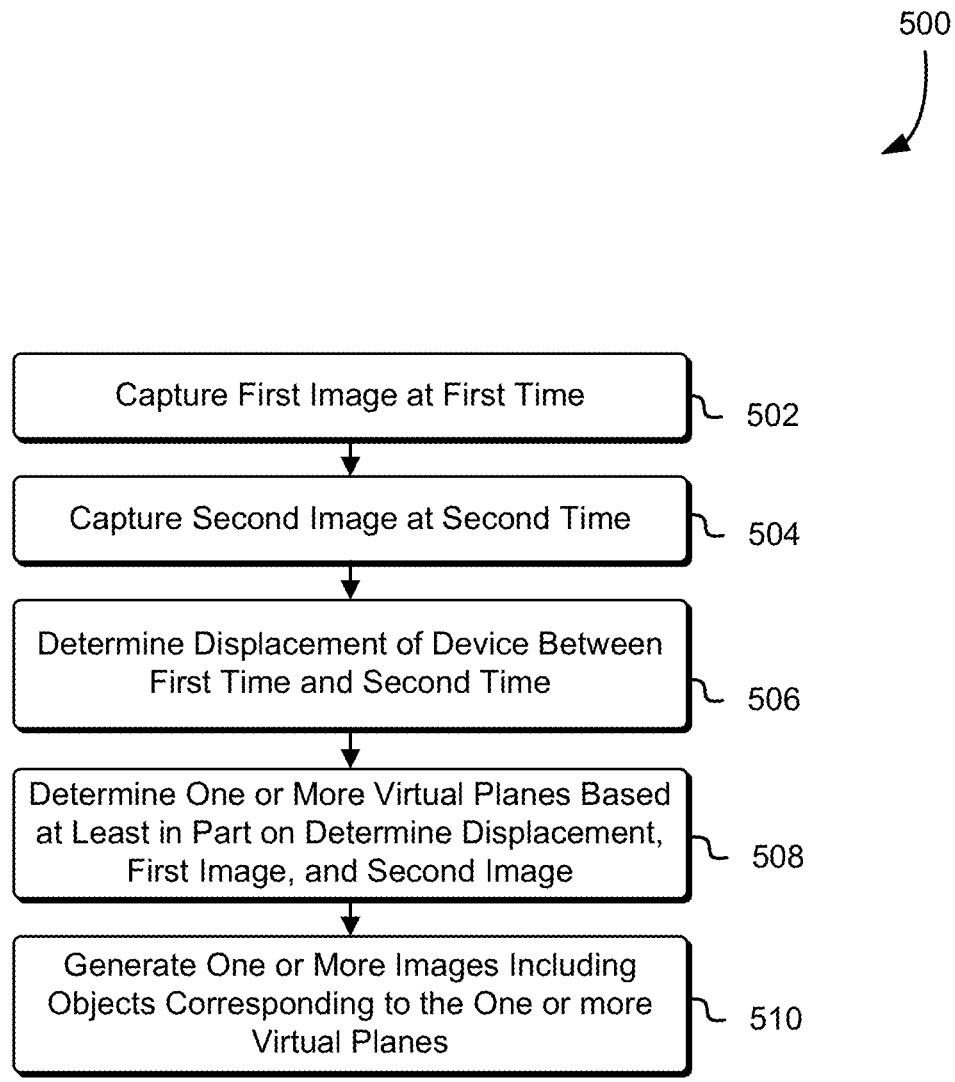
FIG. 5 illustrates a process where three dimensional information may be determined in accordance with an embodiment.

FIG. 5 illustrates a process 500 for generating a virtual plane for an image in accordance with an embodiments of the present disclosure. The process 500 may be performed by any suitable system such as the mobile device or camera described above in FIGS. 1 and 2 or any combination of systems or component thereof. Returning to FIG. 5, in an embodiment, the process 500 includes capturing a first image at a first time 502. The image may be captured using an application of a mobile device, where the application has access to camera sensors included in the mobile device. For example, the mobile device may have a camera button that may cause the camera to capture an image. Furthermore, the camera application may be configured to capture a second image at a second time 504. For example, when the user hits the camera button described above, the camera application may wait a determined interval of time before indicating to the user that the image was captured. The interval of time may allow the user to move the mobile device (this may include inadvertent movement) and may allow the mobile device to capture multiple images.

Once the images are captured, the mobile device may determine a displacement of the mobile device between the first time and the second time 506, e.g., the time at which the first and second images where captured. The mobile device may determine the displacement using one or more sensors of the mobile device, such as an accelerometer, gyroscope, or GPS sensor as described above. The mobile device may then determine a set of virtual planes corresponding to a set of target objects included in the images based at least in part on the first image, the second image, and the determined displacement 508. As described above, the displacement of the mobile device may enable the mobile device to calculate a distance of a target object based at least in part on the pixel corresponding to the target object in the first and second images. For example, the mobile device may compare the two images in order to obtain relative depth information for a set of target objects included in the two images, in the form of disparities, which are inversely proportional to the differences in distance to the target objects.

The mobile device may then use the determined information to generate one or more images including objects corresponding to the one or more virtual places 510. For example, as described above in connection with FIG. 4, the mobile device may generate an image including a single target object at a distance from the camera corresponding to the determined virtual plane. In numerous variations on process 500, the mobile device may generate an image only for an object for which there is sufficient information for generating a virtual plane. For example, if the displacement of the camera is insufficient for determining a virtual plane for an object further away from the camera, the mobile device may only determine virtual plan information and images for target object sufficiently close to the camera to be calculated.

Figure 6:
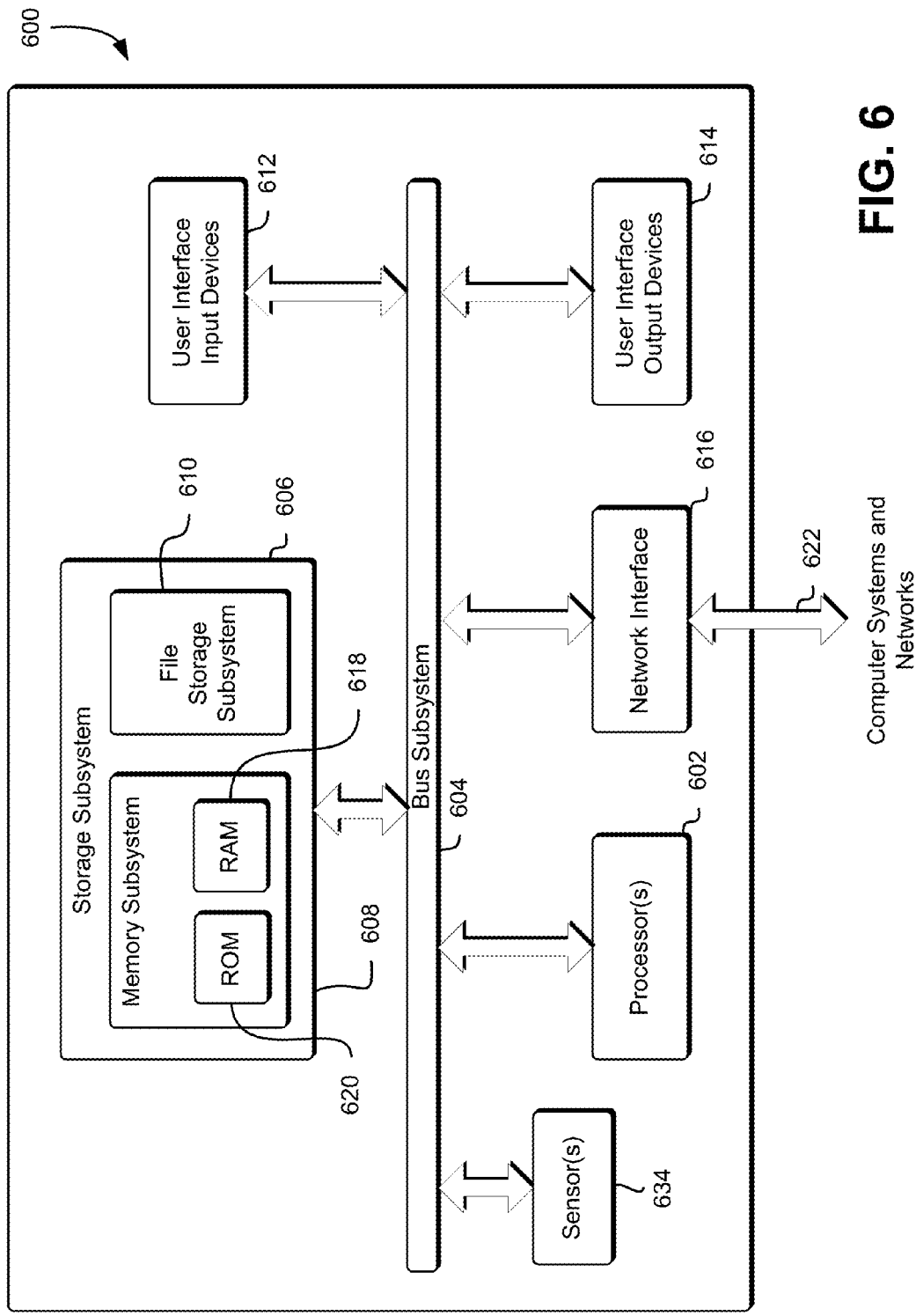
FIG. 6 illustrates an environment in which various embodiments can be implemented.

FIG. 6 is a simplified block diagram of a computer system 600 that may be used to practice an embodiment of the present invention. In various embodiments, one or more instances of the computer system 600 may be used to implement any of the systems illustrated and described above. For example, one or more instances of the computer system 600 may be used to implement processes for generating three dimensional information from a set of two dimensional images according to the present disclosure. As shown in FIG. 6, the computer system 600 may include one or more processors 602 that may be configured to communicate with and are operatively coupled to a number of peripheral subsystems via a bus subsystem 604. These peripheral subsystems may include a storage subsystem 606, comprising a memory subsystem 608 and a file storage subsystem 610, one or more user interface input devices 612, user interface output devices 614, and a network interface subsystem 616. The peripheral subsystems may also include one or more sensors 634 in addition to sensors of input devices 612. Such sensors may include, but are not limited to, GPS sensors, accelerometers, temperature sensors, cameras, and others.

The bus subsystem 604 may provide a mechanism for enabling the various components and subsystems of computer system 600 to communicate with each other as intended. Although the bus subsystem 604 is shown schematically as a single bus, alternative embodiments of the bus subsystem may utilize multiple busses.

The network interface subsystem 616 may provide an interface 622 to other computer systems and networks. The network interface subsystem 616 may serve as an interface for receiving data from and transmitting data to other systems from the computer system 600. For example, the network interface subsystem 616 may enable a user computer system device to connect to the computer system 600 via the Internet and/or other network, such as a mobile network, and facilitate communications using the network(s) and to generate three dimensional information from a set of two dimensional images.

The user interface input devices 612 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. Further, in some embodiments, input devices may include devices usable to obtain information from other devices, such as three dimensional information from a set of two dimensional images captured by a camera. Input devices may include, for instance, magnetic or other card readers, one or more USB interfaces, near field communications (NFC) devices/interfaces and other devices/interfaces usable to obtain data (e.g., a set of two dimensional images) from other devices. In general, use of the term "input device" is intended to include all possible types of devices and mechanisms for inputting information to the computer system 600.

The user interface output devices 614 may include a display subsystem, a printer, non-visual displays (e.g., audio and/or tactile output devices), or other such display devices. Generally, the output devices 614 may invoke one or more of any of the five senses of a user. For example, the display subsystem may be a cathode ray tube (CRT), a flat-panel device, such as a liquid crystal display (LCD), light emitting diode (LED) display, or a projection or other display device. In general, use of the term "output device" is intended to include all possible types of devices and mechanisms for outputting information from the computer system 600. The user interface output devices 614 may be used, for example, to generate and/or present user interfaces to facilitate user interaction with applications performing processes described herein and variations therein, when such interaction may be appropriate. While a computer system 600 with user interface output devices is used for the purpose of illustration, it should be noted that the computer system 600 may operate without an output device, such as when the computer system 600 is operated in a server rack and, during typical operation, an output device is not needed.

The storage subsystem 606 may provide a computer-readable storage medium for storing the programming and data constructs that provide the functionality of the present invention. Software (programs, code modules, instructions) that, when executed by one or more processors 602, may provide the functionality of the present invention, may be stored in storage subsystem 606. The storage subsystem 606 may also provide a repository for storing data used in accordance with the present invention. The storage subsystem 606 may comprise memory subsystem 608 and disk or file storage subsystem 610. The storage subsystem may include database storage for storing 2D and three dimensional information, file storage for storing images and/or other storage functionality.

The memory subsystem 608 may include a number of memory devices including, for example, random access memory (RAM) 618 for storage of instructions and data during program execution and read-only memory (ROM) 620 in which fixed instructions may be stored. The file storage subsystem 610 may provide a non-transitory persistent (non-volatile) storage for program and data files, and may include a hard disk drive, a floppy disk drive along with associated removable media, a compact disk read-only memory (CD-ROM) drive, a digital versatile disk (DVD), an optical drive, removable media cartridges, and other like storage media.

The computer system 600 may be of various types including a personal computer, a portable computer, a workstation, a network computer, a mainframe, a kiosk, a server, or any other data processing system. Due to the ever-changing nature of computers and networks, the description of computer system 600 depicted in FIG. 6 is intended only as a specific example for purposes of illustrating the preferred embodiment of the computer system. Many other configurations having more or fewer components than the system depicted in FIG. 6 are possible.

The various embodiments further can be implemented in a wide variety of operating environments, which in some cases can include one or more user computers, computing devices or processing devices which can be used to operate any of a number of applications. User or client devices may include any of a number of general purpose personal computers, such as desktop, laptop or tablet computers running a standard operating system, as well as cellular, wireless and handheld devices running mobile software and capable of supporting a number of networking and messaging protocols. Such a system may also include a number of workstations running any of a variety of commercially-available operating systems and other known applications for purposes such as development and database management. These devices may also include other electronic devices, such as dummy terminals, thin-clients, gaming systems and other devices capable of communicating via a network. These devices may also include virtual devices such as virtual machines, hypervisors and other virtual devices capable of communicating via a network.

The various embodiments of the present disclosure may utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, or any combination thereof.

In embodiments utilizing a web server, the web server may run any of a variety of server or mid-tier applications, including Hypertext Transfer Protocol ("HTTP") servers, Hypertext Transfer Protocol Secure ("HTTPS") servers, Transport Layer Security ("TLS") servers, File Transfer Protocol ("FTP") servers, Common Gateway Interface ("CGI") servers, data servers, Java servers, Apache servers, Internet Information Services ("IIS") servers, proxy servers (e.g., F5®, Squid, etc.), business application servers, and/or other such servers. The server(s) may also be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python®, JavaScript®, or TCL, as well as combinations thereof. The server(s) may also include database servers, including without limitation those commercially available from Oracle®, Microsoft®, Sybase®, and IBM® as well as open-source servers such as MySQL, Postgres, SQLite, NoSQL, Hadoop, MongoDB, or other servers capable of storing, retrieving, and accessing structured or unstructured data. Database servers may include table-based servers, document-based servers, unstructured servers, relational servers, non-relational servers or combinations of these and/or other database servers.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such storage devices may also include a computer-readable storage media reader, a communications device (e.g., a modem, a network card (wireless or wired), or an infrared communication device), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory (referred to herein as a "non-transitory computer-readable storage medium"), may be tangible (referred to herein as a "tangible computer-readable storage medium"), or may be both tangible and non-transitory (referred to herein as a "tangible non-transitory computer-readable storage medium").

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for comprising:
    capturing, by a computer system of the one or more computer systems, a first image of a scene including at least one target object at a first interval of time;
    capturing, by the computer system, a second image of the scene including the at least one target object at a second interval of time after the first interval of time and distinct from the first interval of time;
    determining a displacement of the computer system between the first interval of time and the second interval of time based at least in part on a sensor included in the computer system;
    calculating three dimensional information corresponding to the target object based at least in part on the first image, the second image, and the determined displacement of the computer system between the first interval of time and the second interval of time by at least generating a set of virtual planes associated with the target object, at least one virtual plane of the set of virtual planes associated with the three dimensional information; and
    generating a third image including the target object from the scene based at least in part on the calculated three dimensional information, where the third image includes the target object without background information from the scene included in the first image and the second image.

2. The computer-implemented method of claim 1, wherein generating the third image further comprises:
    determining a virtual layer associated with the target object; and
    determining a set of pixels of the first image and the second image corresponding to the virtual layer, the set of pixels to be included in the third image.

3. The computer-implemented method of claim 1, wherein determining the displacement on the computer system further comprises obtaining information from at least one additional sensor of the computer system.

4. The computer-implemented method of claim 1, wherein the calculated three dimensional information further comprises a determined distance of the target object from the computer system.

5. The computer-implemented method of claim 1, wherein the calculated three dimensional information further comprises disparity mapping between the first image and the second image.

6. A system, comprising:
    at least one computing device configured to implement one or more services, wherein the one or more services are configured to:
    capture two or more images of a scene including at least one target object, where at least two images of the two or more images are captured at different intervals of time;
    determine an amount of movement of a device responsible for capturing the two or more images between the different intervals of time based at least in part on information obtained from one or more sensors of the device;
    generate a set of virtual planes associated with the at least one target object, at least one virtual plane of the set of virtual planes including distance information of a corresponding target object included in the scene, the distance information determined based at least in part on the determined amount of movement and the two or more images; and
    generate a set of images based at least in part on the set of virtual planes, at least one image of the set of images contains a single target object of the at least one target object.

7. The system of claim 6, wherein the one or more sensors of the device includes at least one of an accelerometer, a GPS sensor, a gyroscope, a camera sensor, a magnetometer, and a proximity sensor.

8. The system of claim 6, wherein the at least one computing device is further configured to determine at least one virtual plane of the set of virtual planes based at least in part on a disparity mapping corresponding to the two or more images.

9. The system of claim 6, wherein the device responsible for capturing the two or more images is a component of the system.

10. The system of claim 6, wherein the at least one computing device is further configured to receive an input from a user indicating a particular target object of the at least one target object to generate an image for, where the generated image contains a set of pixels corresponding to the particular target object from the two or more images.

11. The system of claim 6, wherein the at least one computing device is further configured to detect the at least one target object in the two or more images prior to generating the set of virtual planes.

12. The system of claim 6, wherein generating the set of virtual planes further comprises determining distance information of the corresponding target object included in the scene, such that the distance information indicates that the determined amount of movement of the device is sufficient to calculate a distance between the corresponding target object and the device.

13. The system of claim 6, wherein one or more services are further configured to:
   determine a virtual plane of the set of virtual planes associated with the target object; and
   determine a set of pixels of the two or more images corresponding to the virtual plane, the set of pixels to be included in the at least one image of the set of images.

14. A non-transitory computer-readable storage medium having code stored thereon that, when executed by a computer system, causes the computer system to perform operations including:
   capture, by the computer system, a set of images including a target object, where at least a first image of the set of images is captured at a first interval of time and at least a second image of the set of images is captured at a second interval of time;
   determine a displacement of the computer system between the first interval of time and the second interval of time;
   generate a set of virtual planes corresponding to the target object based at least in part on the determined displacement of the computer system and the first image and the second image; and
   generate a set of images based at least in part on the set of virtual planes and at least one image of the set of images contains the target object.

15. The non-transitory computer-readable storage medium of claim 14, wherein the instructions further comprise instructions that, when executed by the one or more processors, cause the computer system to:
   generate a disparity mapping based at least in part on a first set of pixels from the first image and a second set of pixels from the second image; and
   wherein generating the virtual plane is based at least in part on the generated disparity mapping.

16. The non-transitory computer-readable storage medium of claim 14, wherein the instructions that cause the computer system to capture the set of images further include instructions that cause the computer system to capture the set of images as a result of a single user input.

17. The non-transitory computer-readable storage medium of claim 14, wherein the instructions that cause the computer system to determine the displacement of the computer system further include instructions that cause the computer system to obtain information from one or more sensors of the computer system suitable for determining displacement.

18. The non-transitory computer-readable storage medium of claim 17, wherein the instructions that cause the computer system to obtain information from the one or more sensors of the computer system further include instructions that cause the computer system to obtain the information from at least one of an accelerometer, a GPS sensor, a gyroscope, a camera sensor, a magnetometer, and a proximity sensor.

19. The non-transitory computer-readable storage medium of claim 14, wherein the instructions further comprise instructions that, when executed by the one or more processors, cause the system to determine a set of pixels included in the first image and the second image and corresponding to the target object.

20. The non-transitory computer-readable storage medium of claim 19, wherein the instructions further comprise instructions that, when executed by the one or more processors, cause the system to generate an image of the target object based at least in part on the set of pixels.

* * * * *